United States Patent [19]

Fedor et al.

[11] 4,069,369
[45] Jan. 17, 1978

[54] FINE DISPERSION ALUMINUM BASE BEARING

[75] Inventors: Robert J. Fedor, Westlake, Ohio; Walter E. Smith, Hingham, Mass.

[73] Assignee: Gould Inc., Rolling Meadows, Ill.

[21] Appl. No.: 357,218

[22] Filed: May 4, 1973

Related U.S. Application Data

[63] Continuation of Ser. No. 98,233, Dec. 15, 1970, abandoned, which is a continuation-in-part of Ser. No. 704,678, Feb. 12, 1968, abandoned.

[51] Int. Cl.² ............................. B22F 7/02; B22F 7/04
[52] U.S. Cl. ..................................... 428/557; 428/548; 428/547; 75/208 CS; 75/140; 75/142; 308/237 R
[58] Field of Search ......... 98/233; 75/208 R, 208 CP; 428/557, 547, 548

[56] References Cited

U.S. PATENT DOCUMENTS

| | | | |
|---|---|---|---|
| 2,341,732 | 2/1944 | Marvin | 75/208 CS |
| 2,426,940 | 9/1947 | McCullough | 75/142 X |
| 2,815,567 | 12/1957 | Gould et al. | 29/191.2 X |
| 3,094,415 | 6/1963 | Gallatin et al. | 75/208 CS |
| 3,104,135 | 9/1963 | Morrison et al. | 308/237 R |
| 3,146,099 | 8/1964 | Teja | 75/208 CS |
| 3,161,502 | 12/1964 | Hunsicker et al. | 75/140 X |
| 3,221,392 | 12/1965 | Gould et al. | 29/191.2 X |
| 3,386,161 | 6/1968 | Ruf | 29/196.2 X |
| 3,432,293 | 3/1968 | Michael et al. | 29/191.2 X |

FOREIGN PATENT DOCUMENTS

| | | | |
|---|---|---|---|
| 773,722 | 5/1957 | United Kingdom | 29/191.2 |

*Primary Examiner*—Allen B. Curtis
*Attorney, Agent, or Firm*—Edward E. Sachs

[57] ABSTRACT

A mixture of metals composed predominantly of aluminum and the balance bearing phase materials are heated to a molten state, ejected through an orifice and atomized by impinging a stream of cold water against the molten metal to effect a rapid drop in temperature as well as solidifcation. A layer of the resulting pre-alloyed particles are roll compacted simultaneously with a sacrificial surface layer and a bottom bonding layer, both being composed of aluminum base particulate materials. The bottom layer is devoid of bearing phase materials. The tri-layer strip is sintered, roll clad onto a backing member and post-annealed, blanked and formed into a bearing which is bored to remove the sacrificial layer.

21 Claims, 5 Drawing Figures

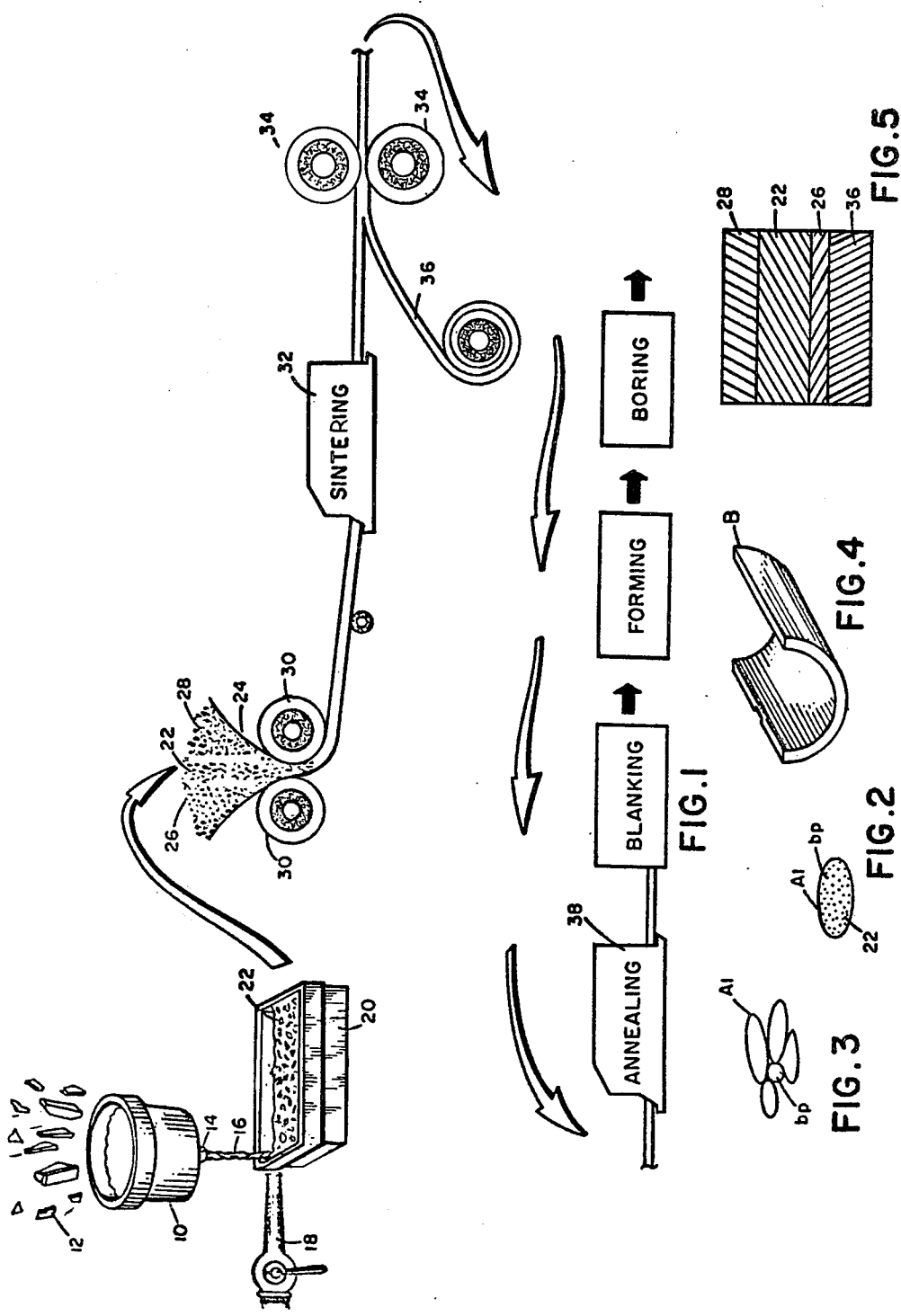

FINE DISPERSION ALUMINUM BASE BEARING

This application is a continuation of application Ser. No. 98,233, filed Dec. 15, 1970 which in turn is a continuation-in-part of application Ser. No. 704,678, filed Feb. 12, 1968, and both now abandoned.

The present invention relates generally to an aluminum base bearing for automotive applications made by powder metallurgy techniques and, more particularly, to a bearing having a surface layer of pre-alloyed, aluminum base particles.

In the prior art aluminum base bearings made by powder metallurgy techniques containing a bearing phase of conventional materials such as lead, tin, cadmium, etc., are already known in the art. Considerable difficulty has been experienced in the fabrication and use of such bearings. Essentially, the problems reside in the difficulty to impart adequate bearing load carrying capacity and anti-seizure properties to the bearing structure. The absence of such properties causes cracking of the grain interparticle boundary and a pull out of the bearing phase particles from the bearing surface. In conventional aluminum base bearings produced by powder metallurgy techniques, the bearing phase particles have an interstitial position relative to the aluminum particles and, consequently, the bearing phase distribution is significantly coarse. In producing aluminum-lead-tin type bearings by roll compacting the difficulty of processing such a structure is increased due to the interaction between the bearing phase, and the contact surfaces of the rolling mills which causes considerable adherence of particles of the compacted strip to the bonding roll.

It has now been found that the difficulties experienced with the prior art bearings and the method for making same can be obviated by a bearing layer in which the particles of the bearing layer are predominantly in pre-alloyed powder form and particularly the bearing phase is in an intra-particle position relative to the aluminum. In conventional aluminum base bearings the bearing phase is in an inter-particle position relative to the aluminum. The invention thus provides a bearing surface in which an interstitial position of the bearing phase between the aluminum particles is prevented and a fine dispersion of the bearing phase in each individual aluminum particle is established.

The distinction between the inter and intra-particle position of the aluminum and a bearing phase is of fundamental importance. When such bearing phase particles are used in elemental form they have a tendency to interfere with the bond between the aluminum particles. This is at least in part due to the interposition of such particles between the aluminum. Even the use of only 10 to 15% of some bearing phase material in elemental form has been found to have deleterious effects. Tri-layer aluminum base type powder metal bearings as such have been known already for some time. For instance, see British Pat. No. 773,722. However, such bearings have a surface layer of bearing phase particles in elemental form and are therefore believed to lack the strength required for automotive applications.

In order to overcome the difficulties normally encountered during roll compacting and roll cladding of the bearing strip having a fine dispersion of the bearing materials, a sacrificial and temporary layer of intermixed particles predominantly of aluminum and bearing phase materials is utilized. The sacrificial layer is removed after fabrication of the strip or bearing.

It is also well known in the prior art that considerable bonding problems occur with respect to aluminum base materials containing bearing phase additives, when such materials are roll clad onto a steel backing member which is commonly used to provide the strength required for a bearing. The layer of pre-alloyed aluminum base powder, produced in accordance with this invention, is powder rolled simultaneously with a layer of aluminum base or pure aluminum particulate material. This last mentioned layer is thus metallurgically compatible with the steel backing member due to the absence of bearing phase materials and can therefore be directly bonded to the steel member. Furthermore, an intermingling of the particles of the bonding layer with those of the pre-alloyed layer establishes a transition zone of considerable depth and consequently promotes a strong bond between the layers.

As used herein "interstitial" position of the bearing phase is defined as the condition in the consolidated aggregate which has the bearing phase completely surrounded by aluminum particle regions. The boundaries of the separate original particles, i.e., bearing phase and aluminum phase particles, are discernible and intact in the final product.

It is therefore the primary object of this invention to provide a bearing strip and bearing for automotive applications of aluminum base powder particles which avoids the difficulties described above and normally experienced with articles known in the prior art and in which the surface layer is composed of aluminum base particles containing a fine dispersion of a bearing phase.

It is another object of this invention to provide, by powder metallurgy, an aluminum base anti-friction bearing and bearing strip having high fatigue as well as excellent anti-seizure properties.

An aspect of the present invention resides in the provision of a fine dispersion aluminum base anti-friction bearing, for automotive use, which is composed of a steel backing member and a powder metal bonding layer on the backing layer comprising more than 55 weight percent aluminum and the balance selected from a first group of additive material consisting of silicon, copper, manganese, magnesium, nickel, iron, zinc, chromium, zirconium and titanium. A powder metal bearing layer is provided on the bonding layer and consists essentially of at least 55 weight percent aluminum and the balance selected from the above mentioned first group of material in an amount of 0 to about 20 weight percent and from a second group composed of bearing phase materials in the amount of 5 to 25 weight percent. The second group consists of lead, tin, cadmium, bismuth and antimony. At least all of the aluminum and the bearing phase material(s) of the bearing layer being in pre-alloyed particle form to establish an intra-particle position relative to each other.

A further aspect of the present invention resides in the provision of a method for making a bearing strip for automotive bearings, in which the steps include the heating of a mixture of metals which are predominantly aluminum and the balance comprised of lead, tin and cadmium or other bearing phase materials. These metals are heated to a molten state and are atomized to achieve a rapid drop in temperature and solidification of the now pre-alloyed particles. These particles are then roll compacted as a layer simultaneously with and interposed between two other layers of aluminum base particles. The tri-layer is sintered and the bottom layer thereof is roll clad onto a steel backing member and thereafter the surface layer is removed.

For a better understanding of the present invention, together with other and further objects thereof, reference is had to the following description taken in connection with the accompanying drawings, and its scope will be pointed out in the appended claims.

In the drawings:

FIG. 1 is a diagrammatic view illustrating a continuous production line for producing a bearing strip and a bearing in accordance with this invention;

FIG. 2 is a schematic illustration of an aluminum base particle in accordance with this invention;

FIG. 3 is a schematic illustration showing an interstitial position of a bearing phase material surrounded by particles of aluminum;

FIG. 4 is a perspective view of a conventional and typical bearing structure; and FIG. 5 is a typical cross-section of the final bearing.

Referring now to the drawing and particularly FIG. 1 thereof, there is shown a crucible 10 for pre-alloying aluminum base particles 12. The raw material 12 is either in ingot or particle form and may be a mixture of elemental constituents, a mixture of elemental and alloyed material or a mixture of alloys. The raw material 12 is placed into the crucible 10 and is heated and vigorously stirred therein for several minutes at a temperature of about 1800° to 1900° F. to melt the individual constituents until the melt has been reduced to a single liquid phase. A melting process of this type is described, in greater detail, in U.S. Pat. No. 1,959,029. The crucible 10 is provided with an orifice 14 to eject the molten mass, under pressure, in a continuous stream 16. Water at room temperature, or air, impinges upon the stream of molten mass 16 to disintegrate the stream and to atomize the molten mass and simultaneously to solidify the resulting particles. The water is directed by means of a jet 18 against the molten mass 16 in such a manner so that the resulting fine drops, or particles, fall into and are collected by a drum 20. Suitable provision is made (not shown) to drain the water. Also, as an alternate to water, gas other than air may be utilized to disintegrate the molten stream 16.

Each of the resulting powder particles 22 is composed of aluminum, a bearing phase material and, optionally, an additive material as more particularly delineated in the Table shown below. The bearing phase (bp) is uniformly dispersed through each aluminum base particle (Al) as schematically shown in FIG. 2. This may be compared to a conventional bearing structure which is obtained by compacting intermixed aluminum (Al) and bearing phase (bp) powders and in which an interstitial position of the bearing phase is established in the final product even though full consolidation of the aggregate is obtained; for illustrative purposes, such a structure is shown in FIG. 3. Consequently, the pre-alloyed aluminum base constituents in accordance with this invention have an intra-particle bearing phase dispersion, see FIG. 2, whereas the structure in accordance with the prior art has an inter-particle bearing phase distribution, see FIG. 3. The additives described in the Table can be dispersed in each individual particle or provided in elemental form, although the former approach is preferred.

Each individual particle of aluminum base pre-alloyed material is elongated in the direction of rolling. The bearing phase, however, while finely and uniformly dispersed in each particle, is only slightly elongated. A typical pre-alloyed aluminum base powder particle in the final structure is, in the preferred embodiment, about 100 microns long and about 40 microns in width and thickness. The average distance separating the bearing phase within a single particle is approximately 5 microns.

The pre-alloyed particles 22 are then collected and dried and fabricated into a bearing strip by being placed into the center opening of a hopper 24 to the left side of which (in the drawing) there is placed aluminum base powder particles 26 to form a bottom or bonding layer, and to the right of layer 22 there is placed a quantity of aluminum base powder particles 28 with bearing phase particles intermixed to establish a sacrificial surface layer to facilitate the roll compacting of the aluminum particles 22. The bonding layer particles 26 are made of materials devoid of a bearing phase to prevent roll sticking of the pre-alloyed materials 22 and to provide a suitable bonding surface. The aluminum base materials 26 and 28 are selected in such a manner to avoid roll sticking, as already noted above, and to establish a closely related, or identical, coefficient of friction with the rolls 30 to provide substantially equal powder feed between the rolls.

For most bearing applications the bearing layer 22 is composed of substantially only pre-alloyed particles. However, for some special applications, it is possible to use the pre-alloyed particles with particles of additive material in elemental form. This may be accomplished by solidifying a multi-phase liquid solution. In any event, however, at least all of the aluminum and bearing phase material of the bearing layer are in a pre-alloyed particle state so as to establish an intra-particle position relative to each other. The bearing layer 22 as a whole should not contain more than a total of 20 weight percent additives (as listed in the Table) of the total composition, and the additives together with the bearing phase should not exceed 45 weight percent. Consequently, the bearing layer is composed of at least 80 weight percent pre-alloyed particles (aluminum and bearing phase), although, preferably, close to 100 weight percent.

In the preferred embodiment, the bonding layer is essentially composed of pure aluminum. Alternatively, however, at least 55 weight percent of aluminum may be utilized with the balance being composed of materials other than those normally classified as bearing materials, see Table. The particles of layer 26 may be either in elemental or alloyed form.

The particles 28 of the sacrificial layer, in the preferred embodiment, are also predominantly composed of aluminum with the balance comprising intermixed additives and bearing phase material in either elemental or alloyed form, so that the bearing phase particles have an interstitial position relative to said aluminum particles.

The following Table shows the composition of the three layers in greater detail.

| | | Base Mat. | | | | Additives | | | | | | | | Bearing Phase | | | | |
|---|---|---|---|---|---|---|---|---|---|---|---|---|---|---|---|---|---|---|
| | | Al | Si | Cu | Mn | Mg | Ni | Fe | Zn | Cr | Zr | Ti | Sn | Pb | Cd | Bi | Sb |
| Bonding Layer (26) | Min | 55 | 0 | 0 | 0 | 0 | 0 | 0 | 0 | 0 | 0 | 0 | — | — | — | — | — |
| | Max | 100 | 13 | 7 | 1.5 | 6 | 3 | 2 | 8 | 1 | 1 | 1 | — | — | — | — | — |
| Bearing Layer (22) | Min | 55 | 0 | 0 | 0 | 0 | 0 | 0 | 0 | 0 | 0 | 0 | 5 | 5 | 5 | 5 | 5 |
| | Max | 95 | 13 | 7 | 1.5 | 6 | 3 | 2 | 8 | 1 | 1 | 1 | 25 | 25 | 25 | 25 | 25 |
| Sacrificial Layer (28) | Min | 50 | 0 | 0 | 0 | 0 | 0 | 0 | 0 | 0 | 0 | 0 | 0 | 0 | 0 | 0 | 0 |
| | Max | 98 | 13 | 7 | 1.5 | 6 | 3 | 2 | 8 | 1 | 1 | 1 | 50 | 50 | 50 | 50 | 50 |

COMPOSITION (In Weight Percent)

The powder particles 22, 26 and 28 are then passed through the powder roll mill 30 and are densely compacted. The resulting tri-layer is sintered in two stages in sintering furnace 32. The initial hold in the furnace 32 is for about two hours at 400° F. and is designed to permit the gas within the composite to escape to avoid the formation of bubbles. Thereafter the temperature in the sintering furnace 32 is increased to 600° to 1100° F. for sintering the tri-layer. The exact temperature and time varies depending upon the internal structure desired. For example, sintering at about 650° F. for ½ hour has been found to be satisfactory.

The sintered structure is then passed through rolls 34 to roll clad a steel backing member 36, face to face, onto the bonding layer 26. Depending upon the ultimate use of the bearing material, the resulting structure is optionally post-annealed for about 30 minutes in an annealing furnace 38 having a temperature of about 600°-750° F.

The strip composed of powder particles 28, 22 and 26 and backing member 36 is then blanked and formed into a bearing of conventional shape, by means of conventional bearing fabrication techniques, as shown for purposes of illustration in FIG. 4.

The bearing structure resulting from the aforedescribed process is shown in cross section in FIG. 5. Each aluminum base layer is identified by the numeral denoting the particle of which each layer is composed.

In order to expose the bearing layer 22, the bearing B, see FIG. 4, is bored by conventional means to suitable dimensions and until all of the layer 28 has been removed. This process step may optionally be performed before the blanking of the bearing strip.

While the most economic and preferred way of carrying out the invention has been described above, it is, however, possible to modify the composition of the bonding layer, for instance by incorporating into the layer a bearing phase which is not normally compatible, for bonding purposes, with the steel backing member. In such a case, in accordance with conventional practices, the backing member must be coated with a bonding interlayer, such as a nickel flash, in order to assure adhesion of the multi-layer aluminum base structure to the backing member.

The following are typical examples of the composition of each aluminum base layer in accordance with this invention.

Bonding Layer 26:
1. 100% aluminum (commercial purity).
2. 94% aluminum and 6% silicon.
3. 0.8% silicon, 4.4% copper, 0.8% manganese, 0.4% magnesium, and the balance aluminum.

Bearing Layer 22:
1. 8.5% lead, 1.5% tin, 4% silicon, 1% copper, and the balance aluminum.
2. 17% lead, 3% tin, 1% copper and the balance aluminum.
3. 20% tin, 1% copper and the balance aluminum.

Sacrificial Layer 28:
1. 20% tin, 1% copper and the balance aluminum.
2. 20% lead and the balance aluminum.
3. 17% lead, 3% tin and the balance aluminum.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A sintered, coherent, multi-layer powder metal composite comprising a powder metal bonding layer, a powder metal bearing layer strongly bonded to said powder metal bonding layer by a sintered transition zone of compacted, intermingled powder particles of said bearing layer and said bonding layer, and a powder metal sacrificial layer bonded to said powder metal bearing layer by a sintered transition zone of compacted, intermingled powder particles of said bearing layer and said sacrificial layer, said powder metal bonding layer comprising more than 55 weight percent aluminum and the balance material selected from a first group of additives consisting of silicon, copper, manganese, magnesium, nickel, iron, zinc, chromium, zirconium, titanium and mixtures thereof;

said powder metal bearing layer comprising from 55 to about 95 weight percent aluminum, from 5 to 25 weight percent bearing phase material selected from a second group of additives consisting of lead, tin, cadmium, bismuth, antimony and mixtures thereof, and from 0 to about 20 weight percent material selected from said first group of additives, at least all of said aluminum and said bearing phase material of said bearing layer being in pre-alloyed particle form with said bearing phase material dispersed in an intra-particle position relative to said aluminum;

said powder metal sacrificial layer comprising intermixed aluminum particles and bearing phase particles, more than 50 weight percent of said particles comprising aluminum particles and the balance of said particles being selected from said first and second groups of additives, the bearing phase material of said sacrificial layer having an interstitial position relative to said aluminum particles.

2. A fine dispersion aluminum base multi-layer bearing material comprising:
   a. the sintered coherent multi-layer composite of claim 1; and
   b. a steel backing layer directly bonded in face-to-face relationship to said bonding layer of said multi-layer composite.

3. A bearing strip according to claim 2, wherein said sacrificial layer consists essentially of 20% tin, 1% copper and the balance aluminum.

4. A bearing strip according to claim 2, wherein said sacrificial layer consists essentially of 20% lead and the balance aluminum.

5. A bearing strip according to claim 2, wherein said sacrificial layer consists essentially of 17% lead, 3% tin and the balance aluminum.

6. The fine dispersion aluminum base multi-layer bearing material of claim 2 wherein said powder metal bearing layer consists essentially of about 100% prealloyed particles.

7. The fine dispersion aluminum base multi-layer bearing material of claim 2 wherein said bearing phase material of said powder metal bearing layer comprises lead.

8. The fine dispersion aluminum base multi-layer bearing material of claim 2 wherein said powder metal bearing layer consists essentially of 8.5% lead, 1.5% tin, 4% silicon, 1% copper and the balance aluminum.

9. The fine dispersion aluminum base multi-layer bearing material of claim 2 wherein said powder metal bearing layer consists essentially of 17% lead, 3% tin, 1% copper and the balance aluminum.

10. The fine dispersion aluminum base multi-layer bearing material of claim 2 wherein said powder metal bearing layer consists essentially of 20% tin, 1% copper and the balance aluminum.

11. A fine dispersion aluminum base bearing strip comprising:
   a sintered, coherent powder metal bonding layer consisting essentially of more than 55 weight percent aluminum and the balance selected from a first group of additives consisting of silicon, copper, manganese, magnesium, nickel, iron, zinc, chromium, zirconium, titanium and mixtures thereof;
   and a sintered, coherent powder metal bearing layer on said bonding layer, said bearing layer consisting essentially of at least 55 weight percent aluminum and the balance selected from said first group of materials in an amount of 0 to about 20 weight percent and from a second group composed of bearing phase materials in the amount of about 5 to 25 weight percent, said second group consisting of lead, tin, cadmium, bismuth, antimony and mixtures thereof;
   at least all of said aluminum and said bearing phase material of said bearing layer being in pre-alloyed particle form to establish an intra-particle position relative to each other,
   said powder metal bonding layer and said powder metal bearing layer being bonded to each other by a sintered transition zone of compacted intermingled powder particles of said bearing layer and said bonding layer.

12. A fine dispersion aluminum base multi-layer bearing material comprising:
   a sintered, coherent, multi-layer powder metal composite comprising a powder metal bonding layer and a powder metal bearing layer strongly bonded to each other by a sintered transition zone of compacted, intermingled powder particles of said bearing layer and said bonding layer; and
   a steel backing layer directly bonded in face-to-face relationship to said bonding layer of said multi-layer composite;
   said powder metal bonding layer consisting essentially of more than 55 weight percent aluminum and the balance material selected from the group consisting of silicon, copper, manganese, magnesium, nickel, iron, zinc, chromium, zirconium, titanium and mixtures thereof;
   and a sintered, coherent powder metal bearing layer on said bonding layer consisting essentially of at least 55 weight percent aluminum and the balance selected from said first group of materials in an amount of 0 to about 20 weight percent and from a second group composed of bearing phase materials in the amount of about 5 to 25 weight percent, said second group consisting of lead, tin, cadmium, bismuth, antimony and mixtures thereof;
   at least all of said aluminum and said bearing phase material of said bearing layer being in pre-alloyed particle form to establish an intra-particle position relative to each other.

13. A fine dispersion aluminum base bearing according to claim 12 wherein said powder metal bearing layer consists essentially of about 100 percent pre-alloyed particles.

14. A bearing according to claim 12, wherein said bonding layer consists essentially of 6 percent silicon and the balance aluminum.

15. A bearing according to claim 12, wherein said bonding layer consists essentially of 0.8% silicon, 4.4% copper, 0.8% manganese, 0.4% magnesium and the balance aluminum.

16. A bearing according to claim 12, wherein said bearing layer consists essentially of 8.5% lead, 1.5% tin, 4% silicon, 1% copper and the balance aluminum.

17. A bearing according to claim 12, wherein said bearing layer consists essentially of 17% lead, 3% tin, 1% copper and the balance aluminum.

18. A bearing according to claim 12, wherein said bearing layer consists essentially of 20% tin, 1% copper and the balance aluminum.

19. A bearing according to claim 12, wherein said bonding layer consists essentially of 100% aluminum of commercial quality, and said bearing layer consists essentially of 8.5% lead, 1.5% tin, 4% silicon, 1% copper and the balance aluminum.

20. A bearing according to claim 12, wherein said bonding layer consists essentially of 0.8% silicon, 0.4% copper, 0.8% manganese, 0.4% magnesium and the balance aluminum; and said bearing layer consists essentially of 8.5% lead, 1.5% tin, 4% silicon, 1% copper and the balance aluminum.

21. The fine dispersion aluminum base multi-layer bearing material of claim 12 wherein said bearing phase material of said powder metal bearing layer comprises lead.

* * * * *